United States Patent
Enjoji

(10) Patent No.: US 10,003,230 B2
(45) Date of Patent: Jun. 19, 2018

(54) AXIAL-GAP MOTOR-GENERATOR

(71) Applicant: HONDA MOTOR CO., LTD., Tokyo (JP)

(72) Inventor: Naoyuki Enjoji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 15/158,588

(22) Filed: May 19, 2016

(65) Prior Publication Data

US 2016/0344249 A1    Nov. 24, 2016

(30) Foreign Application Priority Data

May 19, 2015    (JP) ................. 2015-101966

(51) Int. Cl.
| | |
|---|---|
| *H02K 1/32* | (2006.01) |
| *H02K 5/20* | (2006.01) |
| *H02K 9/06* | (2006.01) |
| *H02K 9/22* | (2006.01) |
| *H02K 1/18* | (2006.01) |
| *H02K 21/24* | (2006.01) |
| *H02K 1/27* | (2006.01) |

(52) U.S. Cl.
CPC ............. *H02K 1/32* (2013.01); *H02K 5/20* (2013.01); *H02K 9/06* (2013.01); *H02K 9/22* (2013.01); *H02K 1/182* (2013.01); *H02K 1/2793* (2013.01); *H02K 21/24* (2013.01)

(58) Field of Classification Search
CPC ........ H02K 1/32; H02K 1/182; H02K 1/2706; H02K 5/20; H02K 9/06
See application file for complete search history.

(56) References Cited

U.S. PATENT DOCUMENTS

| | | | | | |
|---|---|---|---|---|---|
| 3,277,323 | A | * | 10/1966 | Parker | H02K 1/20 310/268 |
| 4,309,633 | A | * | 1/1982 | Marandet | H02K 49/046 310/105 |
| 4,451,749 | A | * | 5/1984 | Kanayama | H02K 21/24 310/156.37 |
| 4,510,409 | A | * | 4/1985 | Kanayama | H02K 1/32 310/268 |
| 4,536,672 | A | * | 8/1985 | Kanayama | H02K 3/26 310/156.37 |

(Continued)

FOREIGN PATENT DOCUMENTS

JP        2008-245356        10/2008

*Primary Examiner* — Dang Le
(74) *Attorney, Agent, or Firm* — Mori & Ward, LLP

(57) ABSTRACT

An axial-gap motor-generator includes a case, a rotor, a stator, a cooling plate, an air inlet, an outlet, an airflow generating groove, and a radial groove. The rotor is rotatable around a rotating shaft. The stator is fixed to the case. The stator has a first distal end and a second distal end. The first distal end faces the rotating shaft. The cooling plate is in contact with the second distal end. The stator is disposed between the rotating shaft and the cooling plate. The first distance between the air inlet and the rotating shaft is smaller than a second distance between the air outlet and the rotating shaft. The airflow generating groove is provided between the case and the rotor. The radial groove is provided between the case and the cooling plate via which the airflow generation groove is connected to the air outlet.

22 Claims, 10 Drawing Sheets

(56) References Cited

U.S. PATENT DOCUMENTS

| | | | | |
|---|---|---|---|---|
| 4,603,271 A | * | 7/1986 | Maruyama | F04D 25/0653 |
| | | | | 310/156.12 |
| 5,892,307 A | * | 4/1999 | Pavlovich | H02K 1/32 |
| | | | | 310/156.36 |
| 6,720,688 B1 | * | 4/2004 | Schiller | H02K 1/2793 |
| | | | | 310/266 |
| 8,760,017 B2 | * | 6/2014 | Henke | H02K 11/33 |
| | | | | 310/62 |

* cited by examiner

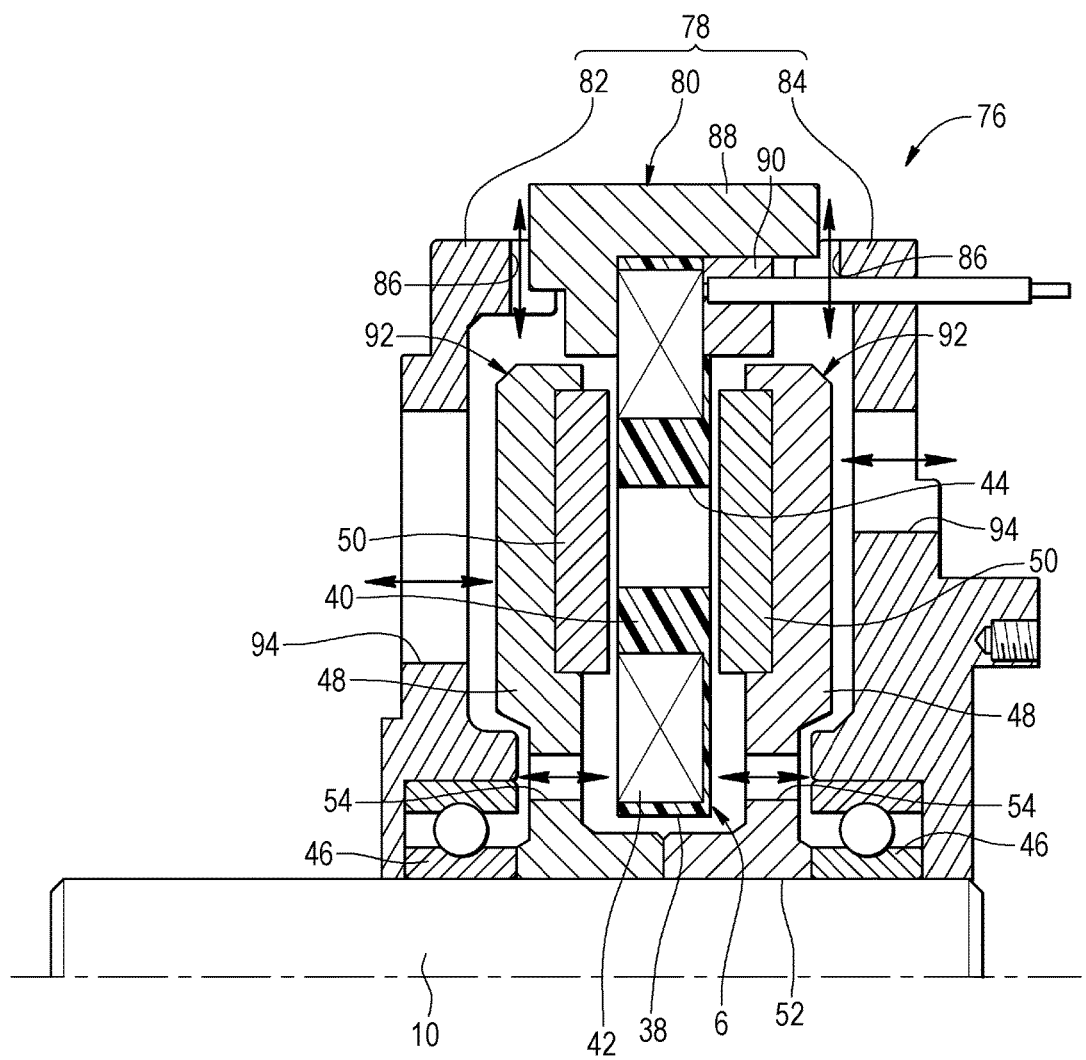

AXIAL-GAP MOTOR-GENERATOR

CROSS-REFERENCE TO RELATED APPLICATIONS

The present application claims priority under 35 U.S.C. § 119 to Japanese Patent Application No. 2015-101966, filed May 19, 2015, entitled "Axial-Gap Motor-Generator." The contents of this application are incorporated herein by reference in their entirety.

BACKGROUND

1. Field

The present invention relates to a axial-gap motor-generator.

2. Description of the Related Art

An axial-gap motor-generator that operates as a motor or a generator includes a stator and a rotor that face each other in a rotational axis direction of the rotor, and is therefore advantageous in that it can be thinner than a motor in which a stator and a rotor face each other in a radial direction. Accordingly, axial-gap motor-generators are used as a motor or generator that is required to be thin, such as a generator that is directly and coaxially connected to a crank shaft of an automobile.

For example, Japanese Unexamined Patent Application Publication No. 2008-245356 describes an axial-gap motor-generator including a stator and a pair of rotors. The stator includes coils, and each rotor includes magnets. The rotors face each other with the stator disposed therebetween. Cooling fans are attached to the pair of rotors at the sides that face away from each other. Each cooling fan generates airflows with plate-shaped blades that project from an attachment surface in the rotational axis direction, thereby dissipating heat generated by the coils.

SUMMARY

According to one aspect of the present invention, an axial-gap motor-generator that operates as a motor or a generator includes a case, a rotor, a stator, and a cooling plate. The rotor is accommodated in and rotatably supported by the case. The rotor includes a magnet. The stator is accommodated in and fixed to the case. The stator includes a coil that faces the magnet in an axial direction of a rotating shaft of the rotor. The cooling plate is disposed on an outer side of the stator in a radial direction. The case includes an air inlet provided in an inner region in the radial direction and an air outlet provided in an outer region in the radial direction. The rotor includes an airflow generating groove in an end surface thereof that faces in the axial direction. The airflow generating groove has an extending length in the radial direction. The cooling plate includes a radial groove in an end surface thereof that faces in the axial direction. The radial groove extends in the radial direction. The cooling plate is in contact with an outer peripheral edge of the stator.

According to another aspect of the present invention, an axial-gap motor-generator includes a case, a rotor, a stator, a cooling plate, an air inlet, an outlet, an airflow generating groove, and a radial groove. The rotor is accommodated in the case so as to be rotatable around a rotating shaft extending in an axial direction. The rotor includes a magnet. The stator is fixed to the case to be accommodated in the case. The stator includes a coil facing the magnet in the axial direction. The stator has a first distal end and a second distal end opposite to the first distal end in a radial direction substantially perpendicular to the axial direction. The first distal end faces the rotating shaft in the radical direction. The cooling plate is in contact with the second distal end. The stator is disposed between the rotating shaft and the cooling plate in the radial direction. The air inlet is provided in the case. The outlet is provided in the case. The first distance between the air inlet and the rotating shaft in the radial direction is smaller than a second distance between the air outlet and the rotating shaft in the radial direction. The airflow generating groove is provided between the case and the rotor in the axial direction so as to be connected to the air inlet. The radial groove is provided between the case and the cooling plate in the axial direction via which the airflow generation groove is connected to the air outlet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 13 is a sectional view of a motor-generator according to a third embodiment.

DESCRIPTION OF THE EMBODIMENTS

Figure 1:
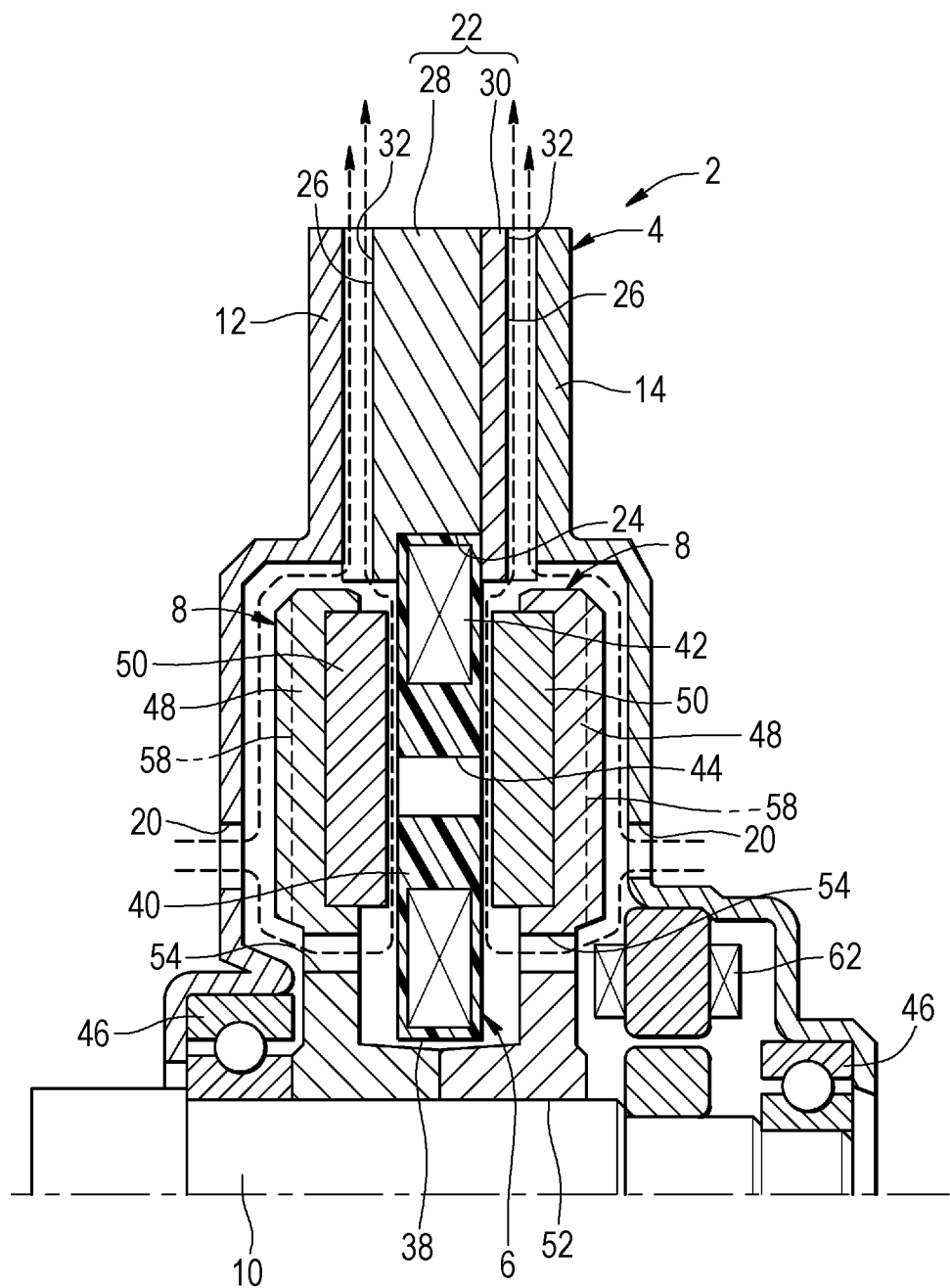
FIG. 1 is a sectional view of a motor-generator according to a first embodiment.

The embodiments will now be described with reference to the accompanying drawings, wherein like reference numerals designate corresponding or identical elements throughout the various drawings.

Embodiments of the present disclosure will be described with reference to the drawings. As illustrated in FIG. 1, a motor-generator 2 includes a case 4, a stator 6 fixed to the case 4, and rotors 8 that are rotatably supported by the case 4. In the following description, the direction in which a rotating shaft 10 of the rotors 8 extends is referred to as an axial direction, the direction orthogonal to the axial direction is referred to as a radial direction, and the direction in which the rotors 8 rotate is referred to as a circumferential direction.

Figure 2:
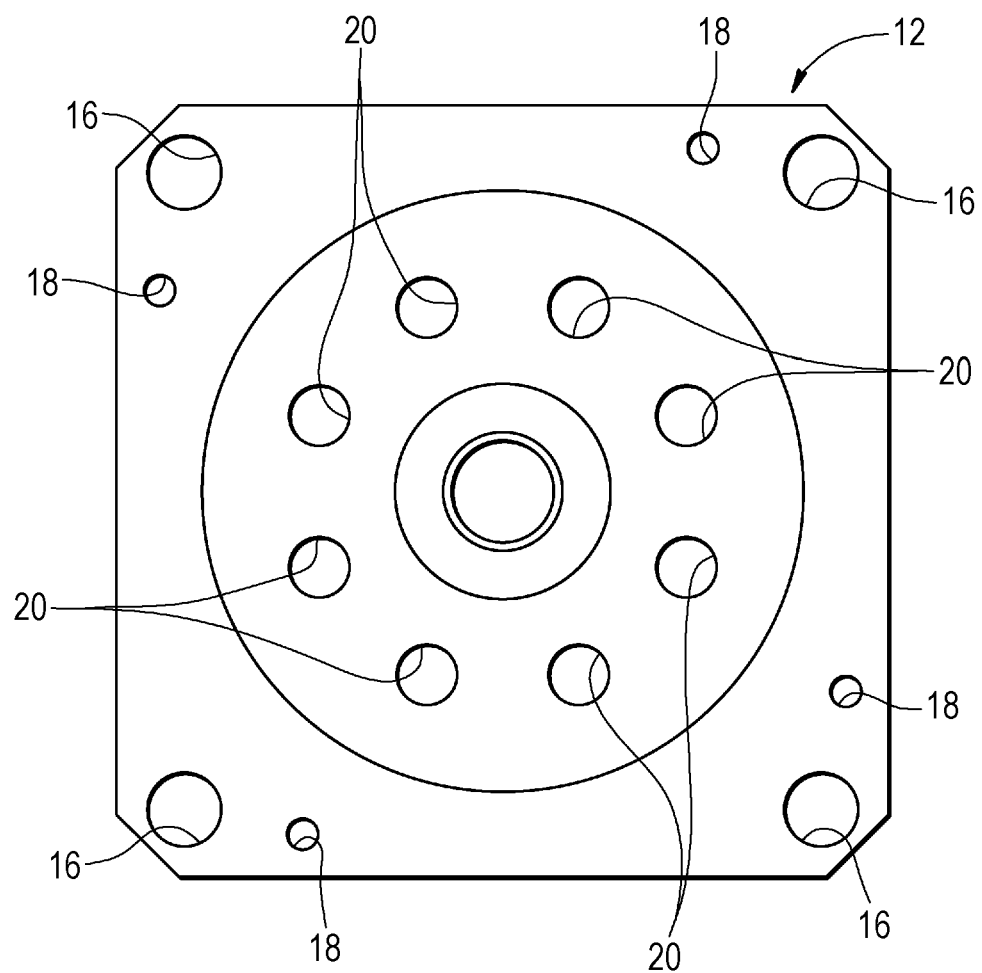
FIG. 2 is a plan view of a lid of a case included in the motor-generator according to the first embodiment.

The case 4 includes a front lid 12 and a rear lid 14. The case 4 includes a circular portion that overlaps the stator 6 and the rotors 8 in the axial direction in plan view, and a flange portion that is provided outside the circular portion and that has a substantially square outer edge. FIG. 2 is a plan view of the front lid 12. The front lid 12 has attachment holes 16 and bolt holes 18 at the corners thereof. The attachment holes 16 are used to attach the motor-generator 2 to an object. The bolt holes 18 are used to fasten the front lid 12 and the rear lid 14 together. The front lid 12 also has air inlets 20 through which air is introduced into the motor-generator 2. The air inlets 20 are formed in a region close to the rotating shaft 10 in the radial direction. The rear lid 14 also has the attachment holes 16, the bolt holes 18, and the air inlets 20 at positions that match the positions of the attachment holes 16, the bolt holes 18, and the air inlets 20 in the front lid 12 in the axial direction. The case 4 is preferably made of a metal.

The stator 6 and a cooling plate 22 will be described with reference to FIGS. 1 and 3 to 6. The stator 6 is fixed to the case 4 with the cooling plate 22 interposed therebetween. The cooling plate 22 is disposed at a location where the outer edge thereof substantially matches the outer edges of the front lid 12 and the rear lid 14 in plan view and where the attachment holes 16 and the bolt holes 18 formed therein are aligned with those in the front lid 12 and the rear lid 14 in the axial direction. The cooling plate 22 is fixed to the case 4 with bolts (not shown) inserted through the bolt holes 18 in the front lid 12, the cooling plate 22, and the rear lid 14. The cooling plate 22 has a central opening edge 24 that defines a circular opening at the center of the cooling plate 22 in plan view, and holds the outer peripheral edge of the stator 6 at the central opening edge 24. The cooling plate 22 is made of a material having a high thermal conductivity, for example, a metal, such as aluminum, or a ceramic.

Figure 4:
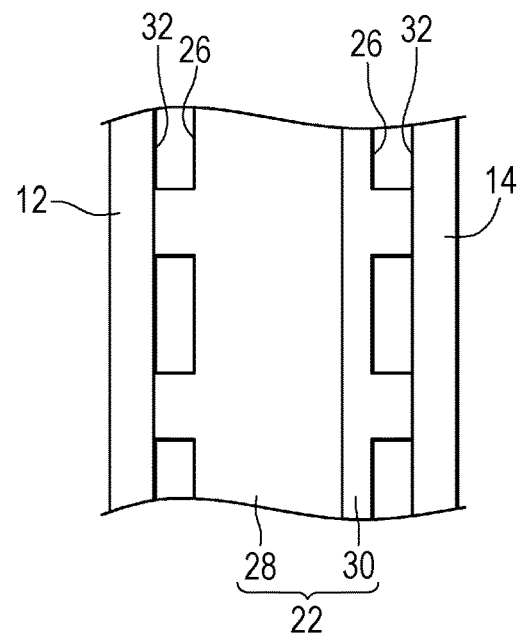
FIG. 4 is a side view of a region around air outlets in the motor-generator according to the first embodiment.
Figure 5:
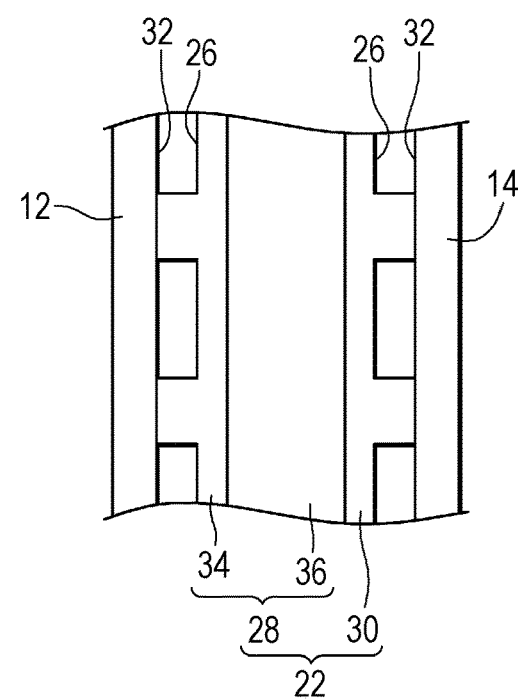
FIG. 5 is a side view of a modification of the region around the air outlets in the motor-generator according to the first embodiment.

The cooling plate 22 has a plurality of radial grooves 26 in both end surfaces that face in the axial direction, the radial grooves 26 extending from the central opening edge 24 to the outer edge. As illustrated in FIG. 4, the cooling plate 22 is formed by stacking a first plate 28 and a second plate 30 together. The radial grooves 26 are formed in the end surfaces of the first and second plates 28 and 30 that face away from each other. Inner edge portions of the first and second plates 28 and 30 in the radial direction form the central opening edge 24. An end surface of the inner edge portion of the first plate 28 at the side opposite to the side at which the radial grooves 26 are formed is stepped such that the end surface is in contact with one end surface and an outer peripheral surface of an outer peripheral edge portion of the stator 6. An end surface of the inner edge portion of the second plate 30 at the side opposite to the side at which the radial grooves 26 are formed is in contact with the other end surface of the outer peripheral edge portion of the stator 6. The cooling plate 22 having the radial grooves 26 is sandwiched by the front lid 12 and the rear lid 14, which include flat plate-shaped outer edge portions, at the outer edge of the case 4 and the cooling plate 22. Accordingly, air outlets 32 are defined by the radial grooves 26 and end surfaces of the front and rear lids 12 and 14 that face in the axial direction. As illustrated in FIG. 5, the first plate 28 of the cooling plate 22 may include a first sub-plate 34 and a second sub-plate 36. The first sub-plate 34 has the radial grooves 26 in one end surface thereof in the axial direction, and the other end surface of the first sub-plate 34 has an inner edge portion that is in contact with the stator 6. The second sub-plate 36 is sandwiched between the first sub-plate 34 and the second plate 30, and has an inner peripheral edge that is in contact with the outer peripheral surface of the stator 6.

Figure 3:
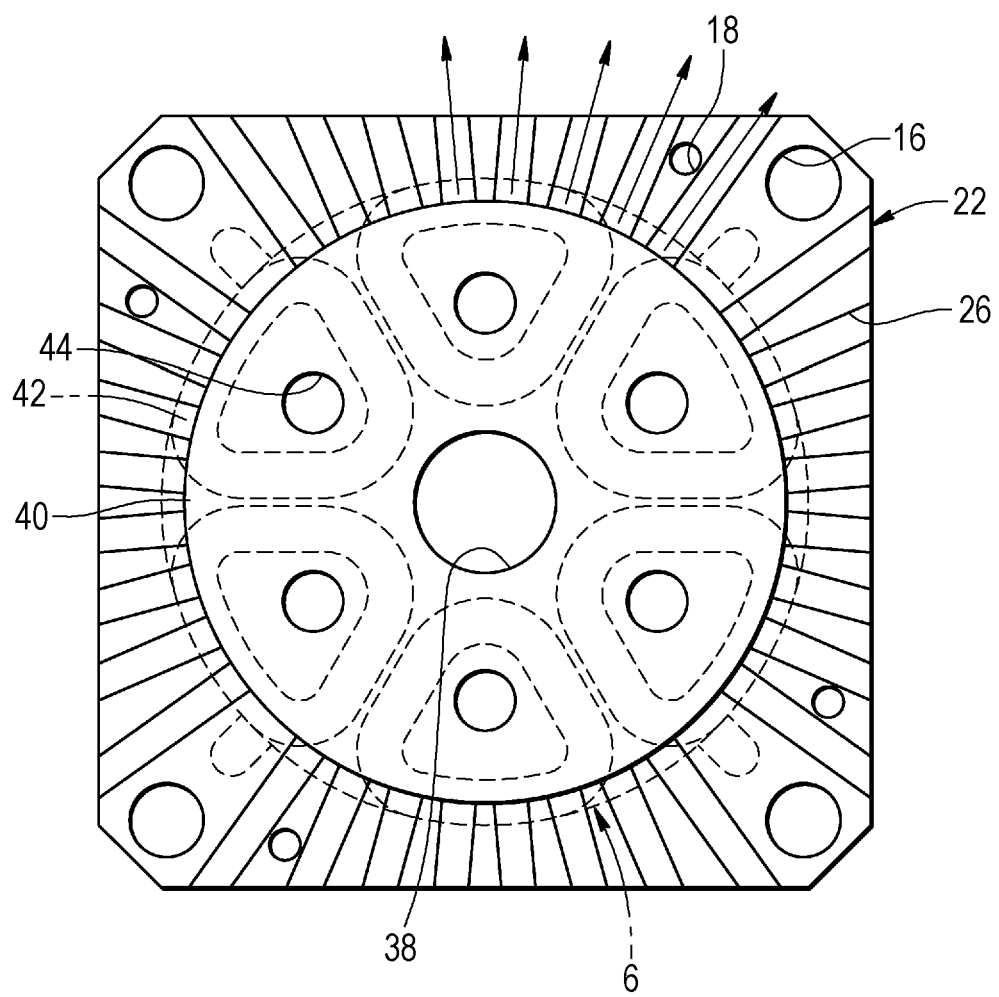
FIG. 3 is a plan view of a stator and a cooling plate included in the motor-generator according to the first embodiment.
Figure 6:
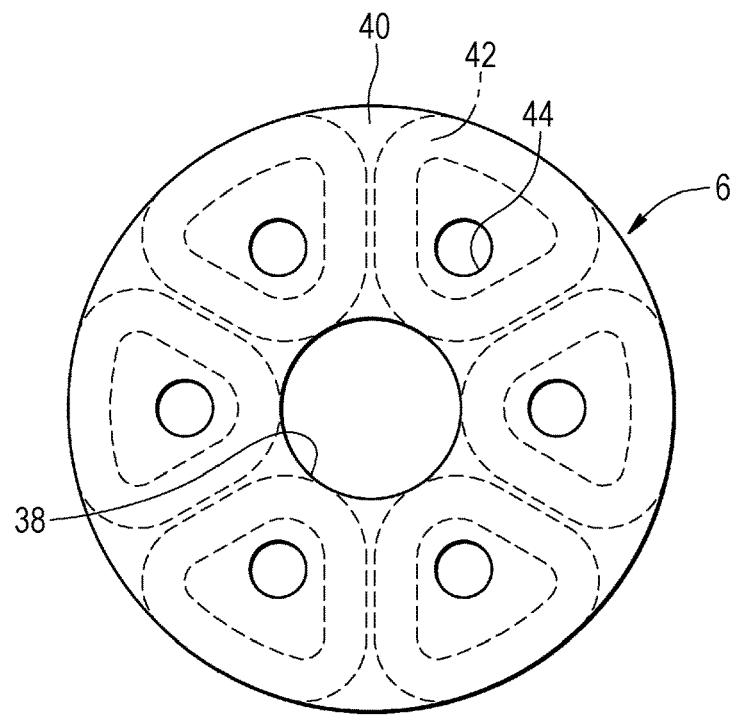
FIG. 6 is a plan view of the stator included in the motor-generator according to the first embodiment.

As illustrated in FIGS. 3 and 6, the stator 6 includes a disc-shaped substrate 40 having an opening 38 at the center and a plurality of coreless coils 42 that are attached to the substrate 40 with substantially constant intervals therebetween in the circumferential direction. As illustrated in FIG. 1, the rotating shaft 10 of the rotors 8 extends through the opening 38. The substrate 40 is made of a resin material, and is formed together with the coils 42 by insert molding. The end surfaces of the coils 42 may either be thinly covered with the resin that forms the substrate 40, or be exposed. The axes of the coils 42 extend in the axial direction of the rotating shaft 10. The substrate 40 has stator holes 44 that extend therethrough along the coil axes of the coils 42. In the outer peripheral region of the stator 6, outer peripheral winding portions of the coils 42 are located on or near the outer peripheral edge of the stator 6.

The central opening edge 24 of the cooling plate 22 is in contact with the outer periphery of the stator 6 over the entire circumference. The coils 42 are disposed in the region where the stator 6 is in contact with the central opening edge 24, and the end surfaces of the winding portions of the coils 42 are embedded in or exposed on the substrate 40. In the case where the cooling plate 22 is formed of a conductor, such as aluminum, an insulator is disposed between the cooling plate 22 and the end surfaces of the winding portions of the coils 42. The insulator is made of, for example, the resin that forms the substrate 40 or an enamel that covers the winding of the coils 42. The cooling plate 22 covers a part of the wiring portion of each coil 42 at the outer periphery of the stator 6, the part having a width that is about quarter to half the width of the wiring portion.

Figure 7:
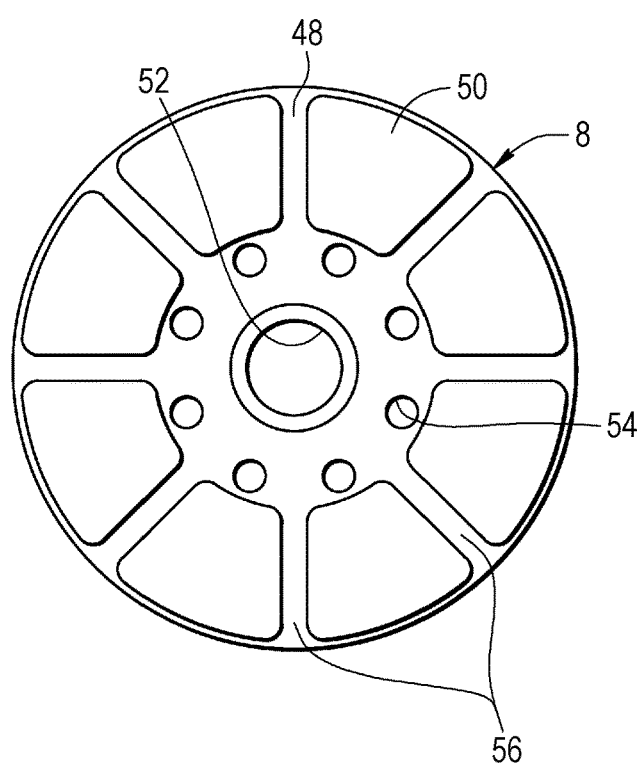
FIG. 7 is a plan view of a rotor included in the motor-generator according to the first embodiment.
Figure 8:
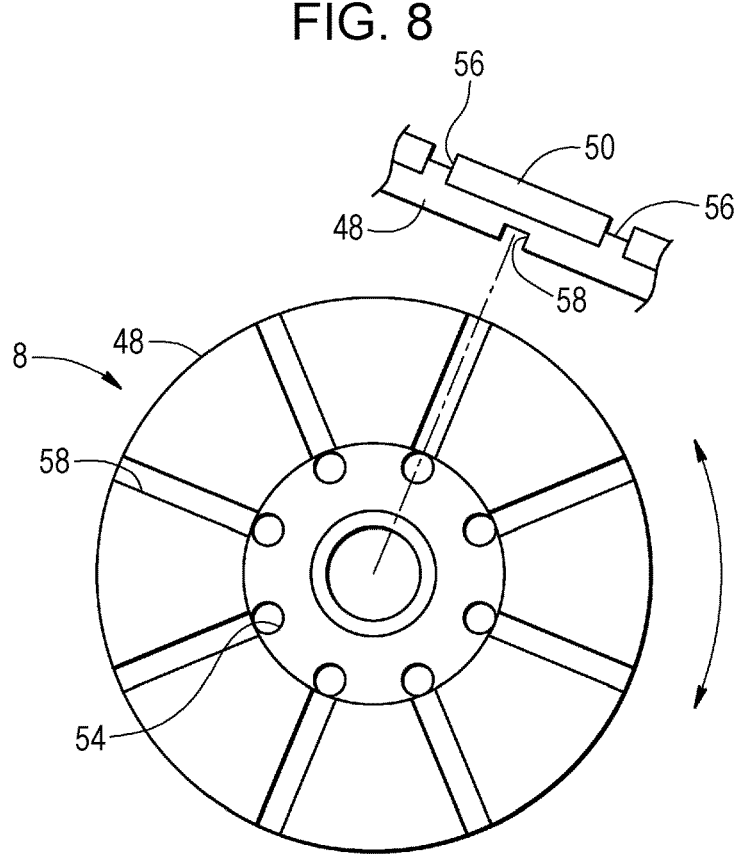
FIG. 8 shows a bottom view and a side view of the rotor included in the motor-generator according to the first embodiment.

The rotors 8 will be described with reference to FIGS. 1, 7, and 8. A single pair of rotors 8 are provided so as to sandwich the stator 6 in the axial direction. Each of the pair of rotors 8 faces the stator 6 with a gap therebetween. The rotors 8 are fixed to the rotating shaft 10. The rotating shaft 10 is rotatably supported by bearings 46 fixed to the case 4. The rotors 8 are mirror-symmetrical about the stator 6.

Each rotor 8 includes a substantially disc-shaped substrate 48 and permanent magnets 50 arranged on the substrate 48 with substantially constant intervals therebetween in the circumferential direction. The substrate 48 has an opening 52, to which the rotating shaft 10 is fitted, at the center, and rotor holes 54 that extend through the substrate 48 in the axial direction in a region on the inner side of the magnets 50 in the radial direction. The outer peripheral edge of the substrate 48 of each rotor 8 is on the inner side of the central opening edge 24 in the cooling plate 22 in the radial direction so that the rotor 8 and the cooling plate 22 do not come into contact with each other.

Figure 9:
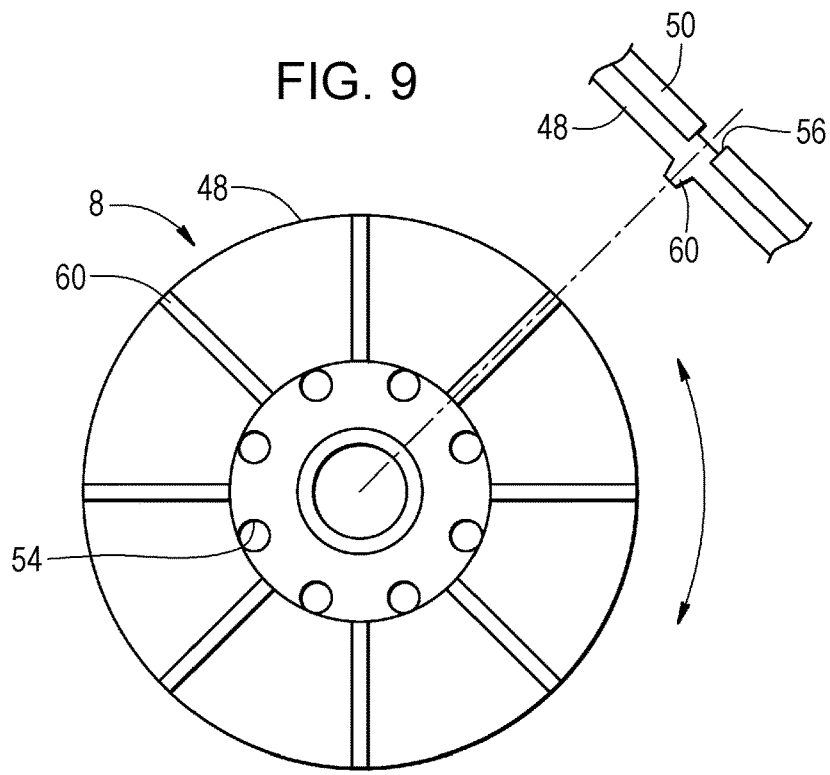
FIG. 9 shows a bottom view and a side view of a modification of the rotor included in the motor-generator according to the first embodiment.
Figure 10:
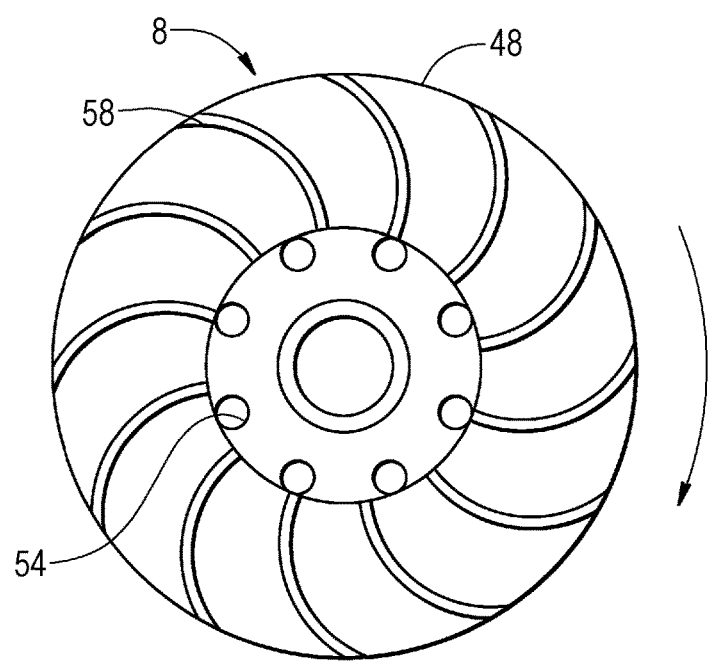
FIG. 10 is a bottom view of another modification of the rotor included in the motor-generator according to the first embodiment.

The magnets 50 are arranged so as to face the coils 42 in the axial direction. The magnets 50 are attached to the substrate 48 so that, at the end surface of the rotor 8 that faces the stator 6, the surfaces of the magnets 50 are closer to the stator 6 than the surface of the substrate 48 is. Accordingly, first airflow generating grooves 56 that extend in the radial direction are defined by side surfaces of the magnets 50 that are adjacent to each other and the surface of the substrate 48. At the end surface of each rotor 8 that does not face the stator 6, second airflow generating grooves 58 are formed in the substrate 48 so as to extend from locations near the rotor holes 54 to the outer peripheral edge in the radial direction. As illustrated in FIG. 9, airflow generating ribs 60 may be provided instead of the second airflow generating grooves 58. In the case where the rotational direction of the rotors 8 is constant, as illustrated in FIG. 10, the second airflow generating grooves 58 may be curved or at an angle relative to the radial direction so that the air flows radially outward when the rotor 8 rotates.

As illustrated in FIG. 1, a resolver 62 may be arranged in the case 4.

The effects of the motor-generator 2 will now be described. The motor-generator 2 operates as a motor or a generator.

Since the cooling plate 22, which has a high thermal conductivity, is in contact with the stator 6 including the coils 42, the heat generated by the coils 42 is transmitted to the cooling plate 22, and the coils 42 are cooled accordingly. The heat transmitted to the cooling plate 22 is dissipated into the air directly or through the case 4. A fluid other than air may instead be brought into contact with the cooling plate 22 or the case 4 as a cooling medium. Since the cooling plate 22 has the radial grooves 26, the cooling plate 22 has a large surface area and easily dissipates heat.

When the rotors 8 are rotated, the first airflow generating grooves 56 and the second airflow generating grooves 58 generate radially outward airflows in the case 4. In the case where the first airflow generating grooves 56 and the second airflow generating grooves 58 extend in the radial direction as illustrated in FIG. 8, the radially outward airflows are generated irrespective of the rotational direction of the rotor. The broken arrows illustrated in FIG. 1 indicate the airflows. The air flows in through the air inlets 20 and flows out through the air outlets 32. The paths along which the air flows mainly include a path along which the air passes through the spaces between the case 4 and the surfaces of the rotors 8 that do not face the stator 6 and flows into flow channels formed by the case 4 and the radial grooves 26, and a path along which the air passes through the rotor holes 54 and spaces between the stator 6 and the surfaces of the rotors 8 that face the stator 6 and flows into the flow channels formed by the case 4 and the radial grooves 26. The airflows directly cool the coils 42, and also cool the cooling plate 22 and the case 4 that receive heat from the coils 42.

Since the stator 6 has the stator holes 44, the surface area thereof is increased. Accordingly, a large amount of heat generated by the coils 42 can be dissipated.

Since the airflows are generated by the first airflow generating grooves 56 and the second airflow generating grooves 58, the size in the axial direction is smaller than that in the case where ribs are provided so as to project from the end surfaces of the rotors 8. Since the first airflow generating grooves 56 are defined by steps between the surface of the substrate 48 and the surfaces of the magnets 50, it is not necessary to increase the thickness of the substrate 48 in the axial direction to form the first airflow generating grooves 56.

Figure 11:
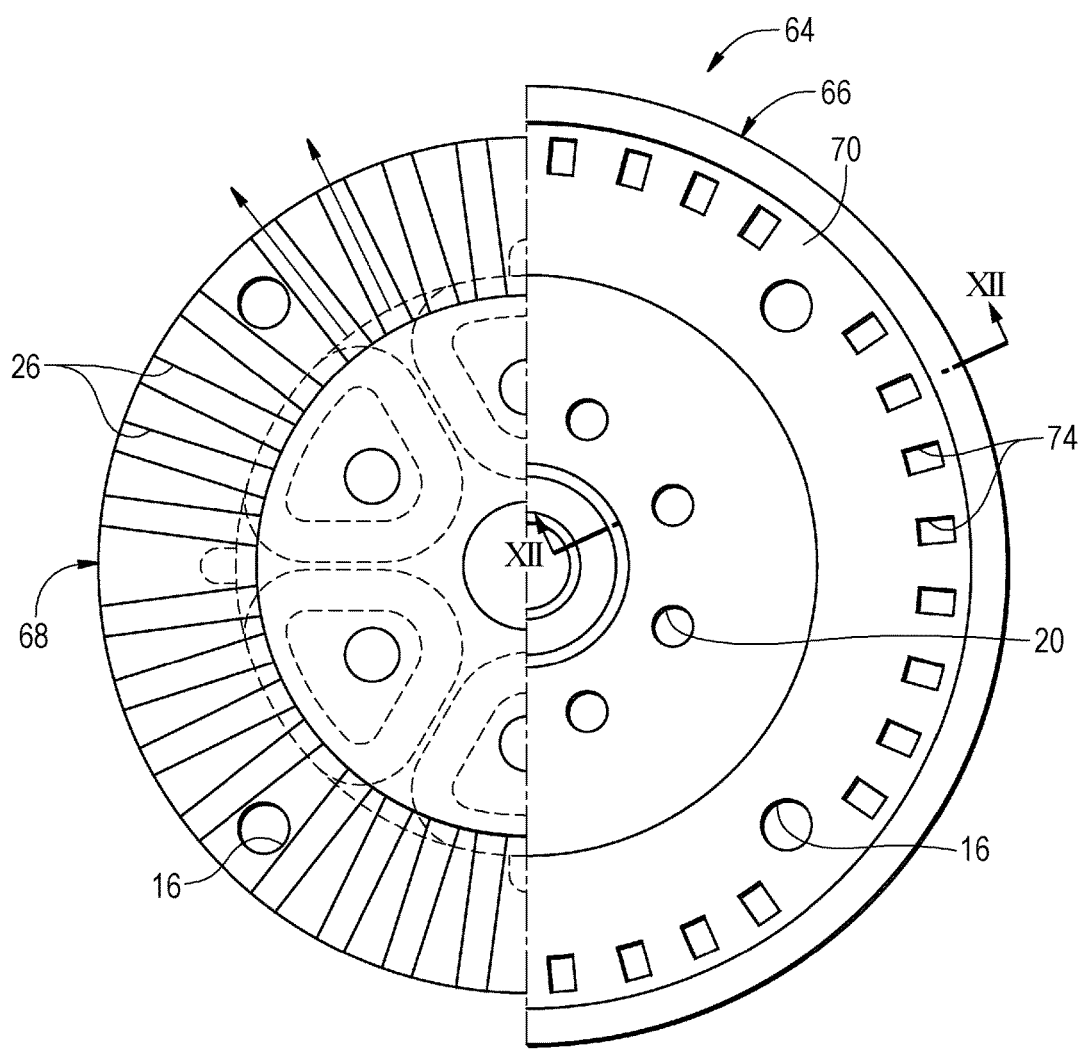
FIG. 11 is a plan view of a motor-generator according to a second embodiment.
Figure 12:
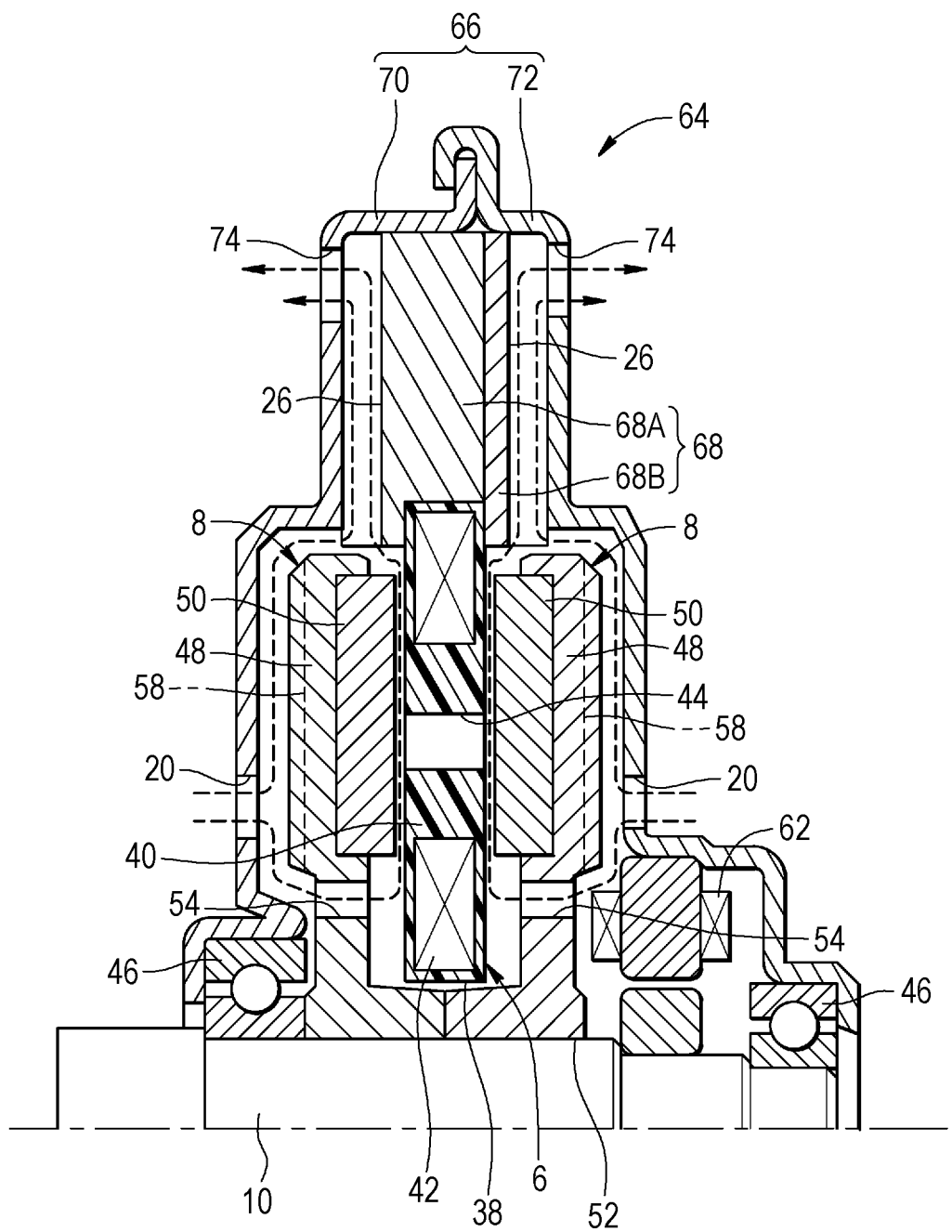
FIG. 12 is a sectional view of the motor-generator according to the second embodiment.

A motor-generator 64 according to a second embodiment will now be described with reference to FIGS. 11 and 12. Structures similar to those in the first embodiment are denoted by the same reference numerals, and descriptions thereof are omitted. The motor-generator 64 according to the second embodiment includes a case 66 and a cooling plate 68 having shapes different from those in the first embodiment.

The case 66 and the cooling plate 68 are substantially circular in plan view. The case 66 includes a front lid 70 and a rear lid 72 that are bonded together by crimping the outer edge portions thereof over the entire circumference or a portion of the circumference. The cooling plate 68 is fixed to the case 66 by being sandwiched between the front lid 70 and the rear lid 72. The cooling plate 68 is similar to that in the first embodiment in that radial grooves 26 are formed therein and in that the cooling plate 68 includes a first plate 68A and a second plate 68B and is in contact with the outer peripheral edge portion of a stator 6.

Each of the front lid 70 and the rear lid 72 has air outlets 74 that extend in the axial direction at locations near the outer edge portion thereof. The airflows generated when the rotors 8 are rotated enter the case 66 through air inlets 20, pass through the spaces between the case 66 and the rotors 8 or through rotor holes 54 and the spaces between the stator 6 and the rotors 8, flow into the flow channels formed by the case 66 and the radial grooves 26, and are then discharged through the air outlets 74.

A motor-generator 76 according to a third embodiment will be described with reference to FIG. 13. Structures similar to those in the first embodiment are denoted by the same reference numerals, and descriptions thereof are omitted. The motor-generator 76 according to the third embodiment basically differs from the first embodiment in that the function corresponding to that of the cooling plate 22 according to the first embodiment is performed by a heat-dissipating member 80 included in a case 78.

Similar to the first embodiment, the case 78 includes a flange portion having a square shape in plan view. However, the case 78 may instead have a circular shape as in the second embodiment. The case 78 includes a front lid 82, a rear lid 84, and the heat-dissipating member 80 that defines an outer peripheral surface of the case 78 and that is sandwiched by the front lid 82 and the rear lid 84. The heat-dissipating member 80 and portions of surfaces of the front lid 82 and the rear lid 84 that sandwich the heat-dissipating member 80, for example, recesses formed in central regions of four sides that form the outer peripheries of the front lid 82 and the rear lid 84, form first vents 86.

The heat-dissipating member 80 includes a first heat-dissipating member 88 that is L-shaped in cross-section and a second heat-dissipating member 90 that is rectangular in cross-section. An L-shaped surface of the first heat-dissipating member 88 and one surface of the second heat-dissipating member 90 form a surface that is angular U-shaped in cross section. The angular U-shaped surface is in contact with an outer peripheral surface of the stator 6 and outer extending portions of both end surfaces of the stator 6 that face in the axial direction. End surfaces of winding portions of coils 42 are embedded in or exposed on a substrate 40 in a region in which the stator 6 is in contact with the heat-dissipating member 80. In the case where the heat-dissipating member 80 is formed of a conductor, such as aluminum, an insulator is disposed between the heat-dissipating member 80 and the end surfaces of the winding portions of the coils 42. The insulator is made of for example, the resin that forms the substrate 40 or an enamel that covers the winding of the coils 42. The heat-dissipating member 80 covers a part of the wiring portion of each coil 42 at the outer periphery of the stator 6, the part having a width that is about quarter to half the width of the wiring portion.

Bolt holes 18 (see FIG. 2) similar to those in the first embodiment are formed in the front lid 82 and the rear lid 84, and bolt holes (not shown) corresponding to the bolt holes 18 are also formed in the first heat-dissipating member 88 and the second heat-dissipating member 90. The first and second heat-dissipating members 88 and 90 are fixed to the front and rear lids 82 and 84 with bolts (not shown) inserted through the bolt holes 18 in the front and rear lids 82 and 84 and the bolt holes in the first and second heat-dissipating members 88 and 90. Thus, the stator 6 is sandwiched by the first and second heat-dissipating members 88 and 90.

Similar to the first embodiment, first airflow generating grooves 56 are formed in end surfaces of a pair of rotors 92 that face the stator 6. End surfaces of the pair of rotors 92 that do not face the stator 6 are not provided with structures corresponding to the second airflow generating grooves 58 according to the first embodiment. Instead, second vents 94 having an opening area greater than that of the air inlets 20 according to the first embodiment are formed at positions corresponding to the air inlets 20 according to the first embodiment.

The heat-dissipating member 80 is made of a material having a high thermal conductivity, for example, a metal, such as aluminum, or a ceramic. Therefore, a large amount of heat is transmitted from the coils 42. In addition, since the heat-dissipating member 80 is in contact with the stator 6 over the angular U-shaped region, the contact area between the heat-dissipating member 80 and the coils 42 is large, and the amount of heat dissipated from the coils 42 is increased. The air flows into and out of the case 78 through the first vents 86 and the second vents 94, and flows through the stator holes 44 and the rotor holes 54 in the case 78. Therefore, the dissipation of heat from the coils 42 is accelerated.

Although the embodiments have been described above, the present disclosure is not limited to the above-described embodiments, and various modifications are possible. For example, in the third embodiment, the heat-dissipating member may be provided with radial grooves. Alternatively, the radial grooves may be formed in portions of the front lid and the rear lid that are in contact with the cooling plate or the heat-dissipating member instead of the cooling plate or the heat-dissipating member. Instead of arranging a pair of rotors on both sides of the stator, a single rotor may be arranged so as to closely face one end surface of the stator.

The axial-gap motor-generator (2, 64) that operates as a motor or a generator includes a case (4, 66); a rotor (8) that is accommodated in and rotatably supported by the case, the rotor including a magnet (50); a stator (6) that is accommodated in and fixed to the case, the stator including a coil (42) that faces the magnet in an axial direction of a rotating shaft (10) of the rotor; and a cooling plate (22) that is disposed on an outer side of the stator in a radial direction. The case includes an air inlet (20) provided in an inner region in the radial direction and an air outlet (32, 74) provided in an outer region in the radial direction. The rotor includes an airflow generating groove (56, 58) in an end surface thereof that faces in the axial direction, the airflow generating groove having an extending length in the radial direction. The cooling plate includes a radial groove (26) in an end surface thereof that faces in the axial direction, the radial groove extending in the radial direction. The cooling plate is in contact with an outer peripheral edge of the stator. The structure in which the airflow generating groove "has an extending length in the radial direction" includes not only a structure in which the airflow generating groove extends in the radial direction but also a structure in which the airflow generating groove is curved or at an angle relative to the radial direction. However, the structure in which the airflow generating groove extends in the circumferential direction is not included.

With this structure, the coil is cooled by the cooling plate. When the rotor rotates, the airflow generating groove generates a radially outward airflow. The airflow cools the coil, and also cools the cooling plate, which receives heat from the coil, when the airflow travels along the radial groove. Since the structure that generates the airflow is a groove, the size of the motor-generator in the axial direction is not increased.

In the above-described structure, the air inlet may be formed in an end surface of the case that faces in the axial direction in the inner region in the radial direction, and the air outlet may be formed in an outer peripheral surface of the case.

With this structure, the airflow generated by the airflow generating groove easily travels from the inner region toward the outer region in the radial direction, and the cooling efficiency can be increased.

In the above-described structure, the air outlet (32) may be an outlet of a flow channel formed by bringing the end surface of the cooling plate in which the radial groove is formed into contact with an inner surface of the case (4).

With this structure, the air linearly flows through the motor-generator in the radial direction, so that the airflow is not obstructed. Accordingly, the cooling efficiency can be increased.

In the above-described structure, the stator may include a disc-shaped substrate (40) formed of an insulator that supports the coil, and the cooling plate may be formed of a metal or ceramic material having a central opening edge (24) that is in contact with the substrate.

With this structure, the cooling plate and the stator are arranged substantially on the same plane, so that an increase in the size of the motor-generator in the axial direction can be suppressed.

In the above-described structure, the central opening edge may be in contact with an outer periphery of the stator and outer peripheral portions of both end surfaces of the stator over an angular U-shaped region, and a portion of the coil may be disposed at or near a location where the stator is in contact with the cooling plate.

With this structure, the contact area between the cooling plate and the coil can be increased, so that the amount of heat dissipated from the coil can be increased accordingly.

In the above-described structure, the cooling plate may include a first plate member (28) that is in contact with an outer peripheral surface of the stator and one end surface of the stator, and a second plate member (30) that is in contact with the other end surface of the stator and that is stacked on the first plate member, and the radial groove may be formed in each of surfaces of the first plate member and the second plate member that face away from each other.

With this structure, the cooling plate, which is in contact with the stator over the angular U-shaped region, can be easily manufactured and assembled. In addition, since the radial groove is formed in both surfaces, the heat dissipation effect can be increased.

In the above-described structure, the airflow generating groove may be formed in each of end surfaces of the rotor in the axial direction.

With this structure, the amount of air that flows in the motor-generator can be increased without increasing the size of the motor-generator in the axial direction, and the cooling effect can be increased accordingly.

In the above-described structure, the airflow generating groove (56) may be formed in an end surface of the rotor that faces the stator, and an airflow generating rib (60) may be formed on an end surface of the rotor that does not face the stator, the airflow generating rib having an extending length in the radial direction.

With this structure, the amount of air that flows in the motor-generator can be increased without largely increasing the size of the motor-generator in the axial direction, and the cooling effect can be increased accordingly.

The present disclosure provides a thin axial-gap motor-generator capable of cooling coils.

Obviously, numerous modifications and variations of the present invention are possible in light of the above teachings. It is therefore to be understood that within the scope of the appended claims, the invention may be practiced otherwise than as specifically described herein.

What is claimed is:

1. An axial-gap motor-generator that operates as a motor or a generator, the axial-gap motor-generator comprising:
   a case;
   a rotor that is accommodated in and rotatably supported by the case, the rotor including a magnet;
   a stator that is accommodated in and fixed to the case, the stator including a coil that faces the magnet in an axial direction of a rotating shaft of the rotor; and
   a cooling plate that is disposed on an outer side of the stator in a radial direction,
   wherein the case includes an air inlet provided in an inner region in the radial direction and an air outlet provided in an outer region in the radial direction, the air outlet being formed between the cooling plate and the case in the axial direction,
   wherein the rotor includes an airflow generating groove in an end surface thereof that faces in the axial direction, the airflow generating groove having an extending length in the radial direction,
   wherein the cooling plate includes a radial groove in an end surface thereof that faces in the axial direction, the radial groove extending in the radial direction, and
   wherein the cooling plate is in contact with an outer peripheral edge of the stator.

2. The axial-gap motor-generator according to claim 1, wherein the air inlet is formed in an end surface of the case that faces in the axial direction in the inner region in the radial direction, and the air outlet is formed in an outer peripheral surface of the case.

3. The axial-gap motor-generator according to claim 1, wherein the stator includes a disc-shaped substrate formed of an insulator that supports the coil, and
   wherein the cooling plate is formed of a metal or ceramic material having a central opening edge that is in contact with the substrate.

4. The axial-gap motor-generator according to claim 1, wherein the airflow generating groove is formed in each of end surfaces of the rotor in the axial direction.

5. The axial-gap motor-generator according to claim 1, wherein the airflow generating groove is formed in an end surface of the rotor that faces the stator, and an airflow generating rib is formed on an end surface of the rotor that does not face the stator, the airflow generating rib having an extending length in the radial direction.

6. The axial-gap motor-generator according to claim 1, wherein the air outlet is disposed directly between the cooling plate and the case in the axial direction.

7. An axial-gap motor-generator comprising:
   a case;
   a rotor that is accommodated in the case so as to be rotatable around a rotating shaft extending in an axial direction and that includes a magnet;
   a stator that is fixed to the case to be accommodated in the case and that includes a coil facing the magnet in the axial direction, the stator having a first distal end and a second distal end opposite to the first distal end in a radial direction substantially perpendicular to the axial direction, the first distal end facing the rotating shaft in the radical direction;
   a cooling plate that is in contact with the second distal end, the stator being disposed between the rotating shaft and the cooling plate in the radial direction;
   an air inlet provided in the case;
   an air outlet provided in the case, a first distance between the air inlet and the rotating shaft in the radial direction being smaller than a second distance between the air outlet and the rotating shaft in the radial direction, the air outlet being formed between the cooling plate and the case in the axial direction;
   an airflow generating groove provided between the case and the rotor in the axial direction so as to be connected to the air inlet; and
   a radial groove provided between the case and the cooling plate in the axial direction via which the airflow generation groove is connected to the air outlet.

8. The axial-gap motor-generator according to claim 7, wherein the air inlet is opened in the axial direction, and wherein the air outlet is opened in the radical direction.

9. The axial-gap motor-generator according to claim 7, wherein the stator includes a disc-shaped substrate having an insulator that supports the coil, and
   wherein the cooling plate includes a metal or ceramic material having a central opening edge that is in contact with the disc-shaped substrate.

10. The axial-gap motor-generator according to claim 9, wherein the central opening edge covers the second distal end, and
    wherein a portion of the coil is disposed at a location where the stator is in contact with the cooling plate.

11. The axial-gap motor-generator according to claim 7, wherein the airflow generating groove is formed in each of end surfaces of the rotor in the axial direction.

12. The axial-gap motor-generator according to claim 7, wherein the airflow generating groove is formed in an end surface of the rotor that faces the stator, and
    wherein an airflow generating rib is formed on an end surface of the rotor that does not face the stator, the airflow generating rib having an extending length in the radial direction.

13. The axial-gap motor-generator according to claim 7, wherein the rotating shaft is rotatably supported by bearings provided to the case.

14. The axial-gap motor-generator according to claim 7, wherein the rotor has a substrate on which the magnet is disposed.

15. The axial-gap motor-generator according to claim 14, wherein the substrate has an opening to which the rotating shaft is fitted.

16. The axial-gap motor-generator according to claim 7, wherein the stator has stator holes.

17. The axial-gap motor-generator according to claim 7, wherein the air outlet is disposed directly between the cooling plate and the case in the axial direction.

18. An axial-gap motor-generator that operates as a motor or a generator, the axial-gap motor-generator comprising:
    a case;
    a rotor that is accommodated in and rotatably supported by the case, the rotor including a magnet;
    a stator that is accommodated in and fixed to the case, the stator including a coil that faces the magnet in an axial direction of a rotating shaft of the rotor; and a cooling plate that is disposed on an outer side of the stator in a radial direction, wherein the case includes an air inlet provided in an inner region in the radial direction and an air outlet provided in an outer region in the radial direction, wherein the rotor includes an airflow generating groove in an end surface thereof that faces in the axial direction, the airflow generating groove having an extending length in the radial direction, wherein the cooling plate includes a radial groove in an end surface thereof that faces in the axial direction, the radial groove extending in the radial direction, wherein the cooling plate is in contact with an outer peripheral edge of the stator, and wherein the air outlet is an outlet of a flow channel formed by bringing the end surface of the cooling plate in which the radial groove is formed into contact with an inner surface of the case.

19. An axial-gap motor-generator that operates as a motor or a generator, the axial-gap motor-generator comprising:
    a case;
    a rotor that is accommodated in and rotatably supported by the case, the rotor including a magnet;
    a stator that is accommodated in and fixed to the case, the stator including a coil that faces the magnet in an axial direction of a rotating shaft of the rotor; and
    a cooling plate that is disposed on an outer side of the stator in a radial direction,
    wherein the case includes an air inlet provided in an inner region in the radial direction and an air outlet provided in an outer region in the radial direction,
    wherein the rotor includes an airflow generating groove in an end surface thereof that faces in the axial direction, the airflow generating groove having an extending length in the radial direction,
    wherein the cooling plate includes a radial groove in an end surface thereof that faces in the axial direction, the radial groove extending in the radial direction,
    wherein the cooling plate is in contact with an outer peripheral edge of the stator,
    wherein the stator includes a disc-shaped substrate formed of an insulator that supports the coil,
    wherein the cooling plate is formed of a metal or ceramic material having a central opening edge that is in contact with the substrate, and
    wherein the central opening edge is in contact with an outer periphery of the stator and outer peripheral portions of both end surfaces of the stator over an angular U-shaped region, and a portion of the coil is disposed at or near a location where the stator is in contact with the cooling plate.

20. The axial-gap motor-generator according to claim 19, wherein the cooling plate includes a first plate member that is in contact with an outer peripheral surface of the stator and one end surface of the stator, and a second plate member that is in contact with the other end surface of the stator and that is stacked on the first plate member, and
    wherein the radial groove is formed in each of surfaces of the first plate member and the second plate member that face away from each other.

21. An axial-gap motor-generator comprising:
    a case;
    a rotor that is accommodated in the case so as to be rotatable around a rotating shaft extending in an axial direction and that includes a magnet;
    a stator that is fixed to the case to be accommodated in the case and that includes a coil facing the magnet in the axial direction, the stator having a first distal end and a second distal end opposite to the first distal end in a radial direction substantially perpendicular to the axial direction, the first distal end facing the rotating shaft in the radical direction;
    a cooling plate that is in contact with the second distal end, the stator being disposed between the rotating shaft and the cooling plate in the radial direction;
    an air inlet provided in the case;
    an air outlet provided in the case, a first distance between the air inlet and the rotating shaft in the radial direction being smaller than a second distance between the air outlet and the rotating shaft in the radial direction;
    an airflow generating groove provided between the case and the rotor in the axial direction so as to be connected to the air inlet; and
    a radial groove provided between the case and the cooling plate in the axial direction via which the airflow generation groove is connected to the air outlet,
    wherein the air outlet is an outlet of a flow channel formed by bringing a surface of the cooling plate in which the radial groove is formed into contact with an inner surface of the case.

22. An axial-gap motor-generator comprising:
    a case;
    a rotor that is accommodated in the case so as to be rotatable around a rotating shaft extending in an axial direction and that includes a magnet;
    a stator that is fixed to the case to be accommodated in the case and that includes a coil facing the magnet in the axial direction, the stator having a first distal end and a second distal end opposite to the first distal end in a radial direction substantially perpendicular to the axial direction, the first distal end facing the rotating shaft in the radical direction;
    a cooling plate that is in contact with the second distal end, the stator being disposed between the rotating shaft and the cooling plate in the radial direction;
    an air inlet provided in the case;
    an air outlet provided in the case, a first distance between the air inlet and the rotating shaft in the radial direction being smaller than a second distance between the air outlet and the rotating shaft in the radial direction;
    an airflow generating groove provided between the case and the rotor in the axial direction so as to be connected to the air inlet; and
    a radial groove provided between the case and the cooling plate in the axial direction via which the airflow generation groove is connected to the air outlet,
    wherein the central opening edge covers the second distal end,
    wherein a portion of the coil is disposed at a location where the stator is in contact with the cooling plate,
    wherein the cooling plate includes a first plate member that is in contact with an outer peripheral surface of the stator and one end surface of the stator, and a second plate member that is in contact with the other end surface of the stator and that is stacked on the first plate member, and
    wherein the radial groove is formed in each of surfaces of the first plate member and the second plate member that face away from each other.

* * * * *